(12) United States Patent
Tang

(10) Patent No.: US 8,286,524 B2
(45) Date of Patent: Oct. 16, 2012

(54) MOTOR ASSEMBLY

(75) Inventor: Xian Tang, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 375 days.

(21) Appl. No.: 12/541,662

(22) Filed: Aug. 14, 2009

(65) Prior Publication Data

US 2010/0037719 A1 Feb. 18, 2010

(30) Foreign Application Priority Data

Aug. 15, 2008 (CN) .......................... 2008 1 0142381

(51) Int. Cl.
*F16H 57/00* (2006.01)
*F16H 1/16* (2006.01)
(52) U.S. Cl. .......................................... 74/411; 74/425
(58) Field of Classification Search .............. 74/406, 74/409, 411, 421 A, 425, 427, 439, 440, 445; 464/182
See application file for complete search history.

(56) References Cited

U.S. PATENT DOCUMENTS

| | | | | | |
|---|---|---|---|---|---|
| 658,624 | A | * | 9/1900 | Egger | 74/594.1 |
| 1,375,852 | A | * | 4/1921 | Linendoll | 29/525.08 |
| 1,494,831 | A | * | 5/1924 | Evans | 101/114 |
| 1,868,474 | A | * | 7/1932 | Strehlow | 180/371 |
| 1,925,161 | A | * | 9/1933 | Williams | 192/48.91 |
| 2,283,606 | A | * | 5/1942 | Lewis | 123/59.6 |
| 2,384,399 | A | * | 9/1945 | Reynolds | 192/150 |
| 2,569,744 | A | * | 10/1951 | Cecka | 241/135 |
| 2,606,257 | A | * | 8/1952 | Briskin | 200/47 |
| 2,640,552 | A | * | 6/1953 | Chillson | 416/49 |
| 2,720,119 | A | * | 10/1955 | Sherman | 74/460 |
| 2,765,668 | A | * | 10/1956 | Milne | 74/409 |
| 2,857,777 | A | * | 10/1958 | Porter | 74/432 |
| 2,924,151 | A | * | 2/1960 | Ufert | 409/21 |
| 2,949,796 | A | * | 8/1960 | Frederick et al. | 74/823 |
| 3,199,364 | A | * | 8/1965 | Dew | 74/460 |
| 3,554,045 | A | * | 1/1971 | Littmann | 74/411 |
| 4,019,405 | A | * | 4/1977 | Winter et al. | 74/344 |
| 4,748,865 | A | * | 6/1988 | Umezawa et al. | 74/411 |
| 4,838,123 | A | * | 6/1989 | Matoba | 475/335 |
| 5,090,261 | A | * | 2/1992 | Nakatsukasa | 74/89.14 |
| 5,606,890 | A | * | 3/1997 | Luckas | 74/411 |
| 5,873,786 | A | * | 2/1999 | Hosoya et al. | 464/73 |
| 6,452,296 | B1 | * | 9/2002 | Torii et al. | 310/75 R |
| 6,460,650 | B2 | * | 10/2002 | Tsuboi et al. | 180/444 |
| 6,628,026 | B2 | * | 9/2003 | Torii et al. | 310/89 |

(Continued)

OTHER PUBLICATIONS

Merriam-Webster's Collegiate Dictionary. 10th edition. Springfield, MA: Merriam-Webster, 1998. p. 1260.*

(Continued)

*Primary Examiner* — Justin Krause
*Assistant Examiner* — Matthew R Vaerewyck
(74) *Attorney, Agent, or Firm* — Muncy, Geissler, Olds & Lowe, PLLC

(57) ABSTRACT

A motor assembly includes a motor, a force transmission structure comprising a drive plate and a shaft, and a gear train connecting the motor to the drive plate for transmitting rotation of the motor to the drive plate. The drive plate has a mounting hole with at least three sections interconnected with one another at a common area, the shaft has a toothed portion with at least three teeth fittingly received in the sections of the mounting hole of the drive plate such that the shaft is rotated with the drive plate.

14 Claims, 3 Drawing Sheets

U.S. PATENT DOCUMENTS

| | | | |
|---|---|---|---|
| 6,682,284 B2* | 1/2004 | Chen | 411/432 |
| 7,028,573 B2* | 4/2006 | Inaba et al. | 74/409 |
| 7,650,809 B2* | 1/2010 | Bernhard et al. | 74/411 |
| 7,793,567 B2* | 9/2010 | Kato | 74/813 L |
| 8,051,737 B2* | 11/2011 | Li et al. | 74/425 |
| 8,052,535 B2* | 11/2011 | Miyawaki | 464/83 |
| 8,117,936 B2* | 2/2012 | Nomura et al. | 74/411 |
| 2001/0002512 A1* | 6/2001 | Fukuchi | 29/893.35 |
| 2002/0020239 A1* | 2/2002 | Adachi et al. | 74/425 |
| 2002/0047376 A1* | 4/2002 | Torii et al. | 310/83 |
| 2002/0047379 A1* | 4/2002 | Torii et al. | 310/89 |
| 2003/0223843 A1* | 12/2003 | Chen | 411/432 |
| 2005/0039561 A1* | 2/2005 | Rupp | 74/425 |
| 2005/0050976 A1* | 3/2005 | Ko et al. | 74/425 |
| 2005/0115350 A1* | 6/2005 | Ohashi et al. | 74/425 |
| 2006/0175123 A1* | 8/2006 | Yabe et al. | 180/444 |
| 2010/0060062 A1* | 3/2010 | Koga et al. | 297/344.1 |

OTHER PUBLICATIONS

Merriam-Webster's Collegiate Dictionary. 10th edition. Springfield, MA: Merriam-Webster, 1998. p. 1370.*

* cited by examiner

MOTOR ASSEMBLY

CROSS REFERENCE TO RELATED APPLICATIONS

This non-provisional patent application claims priority under 35 U.S.C. §119(a) from Patent Application No. 200810142381.1 filed in The People's Republic of China on Aug. 15, 2008.

FIELD OF THE INVENTION

This invention relates to a motor assembly, and in particular, to a motor assembly having a force transmission structure.

BACKGROUND OF THE INVENTION

Usually, a window lift system for a vehicle window comprises a driving motor, a lift device for moving up or down the glass of the window, and a force transmission structure for transmitting rotation of the output shaft of the motor to the lift device. The transmission structure comprises a drive plate and a shaft coupled to the drive plate. The drive plate is connected to the output shaft of the motor via a gear train. The shaft is connected to the lift device via a pinion attached to an end of the shaft and meshed with a gear of the lift device. In operation, the motor drives the drive plate to rotate. The drive plate drivingly rotates the shaft to thereby cause the lift device to move the glass of the window up or down.

Conventionally, the shaft is coupled to the drive plate via a cylindrical coupling end with two flat surfaces at opposite sides thereof fittingly received in a waist-shaped hole of the drive plate. Two opposite flat interfaces are formed between the coupling end of the shaft and the hole of the drive plate. In operation, two reverse forces are exerted on the two flat surfaces of the coupling end of the shaft, which will generate impact on the shaft and the drive plate to thereby generate vibration and noise.

As such, there is a desire for an improved transition structure which can solve the above-mentioned problems.

SUMMARY OF THE INVENTION

Accordingly, in one aspect thereof, the present invention provides a force transmission structure comprising: a drive plate having a mounting hole and a shaft fitted to the mounting hole for rotation with the drive plate, wherein the mounting hole has at least three sections interconnected with one another at a common area, the shaft has a toothed portion with at least three teeth fittingly received in the sections of the mounting hole such that the shaft is fixed to rotate with the drive plate.

Preferably, the drive plate comprises a body and a coupling formed at the center of the body, the coupling is deeper than the body in the axial direction of the body, the mounting hole being formed in the coupling.

Preferably, the coupling has buffer holes respectively located between adjacent sections.

Preferably, the drive plate has a plurality of protrusions formed on a first side of the body and configured to engage with a driving member such that the driving member is able to drive the drive plate, the shaft further comprises a pinion configured to drive a driven member.

Preferably, the drive plate further comprises a plurality of ribs formed at an opposite second side of the body.

Preferably, the mounting hole and the toothed portion are Y-shaped.

Preferably, the drive plate is made of a plastics material.

According to a second aspect, the present invention provides a motor assembly comprising: a motor; a force transmission structure comprising a drive plate and a shaft; and a gear train connecting the motor to the drive plate for driving the drive plate; wherein the drive plate has a mounting hole with at least three sections interconnected with one another at a common area, the shaft has a toothed portion with at least three teeth fittingly received in the sections of the mounting hole of the drive plate such that the shaft is fixed to rotate with the drive plate.

Preferably, the gear train comprises a worm driven by the motor, a worm gear meshed with the worm, and a damper attached to and rotatable with the worm gear, the drive plate being driven by the worm gear through the damper.

Preferably, the worm comprises an inner ring, an outer ring, and a plurality of ribs extending from the inner ring to the outer ring, the damper being received in a space formed between the inner ring and the outer ring and having a plurality of first slots for fittingly receiving the ribs respectively.

Preferably, the drive plate comprises a body and a plurality of protrusions formed at one side of the body, and the damper has a plurality of second slots engaging with the protrusions of the drive plate.

Preferably, the protrusions are V-shaped, the width of the protrusions increasing gradually from the inner most portion towards the outer most portion in a radial direction of the body.

Preferably, the drive plate further comprises a coupling formed at the center of the body, the coupling having a greater axial depth than the body, and the mounting hole being formed in the coupling.

Preferably, the coupling has buffer holes respectively located between adjacent sections of the mounting hole.

Preferably, the mounting hole and the toothed portion of the shaft are Y-shaped.

Preferably, the drive plate is made of a plastics material, and the damper is made of rubber.

Preferably, the shaft further comprises a pinion for driving a gear of a window lift system.

Preferably, the shaft is held captive within the mounting hole by a circlip located within a groove in the distal end of the toothed portion.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
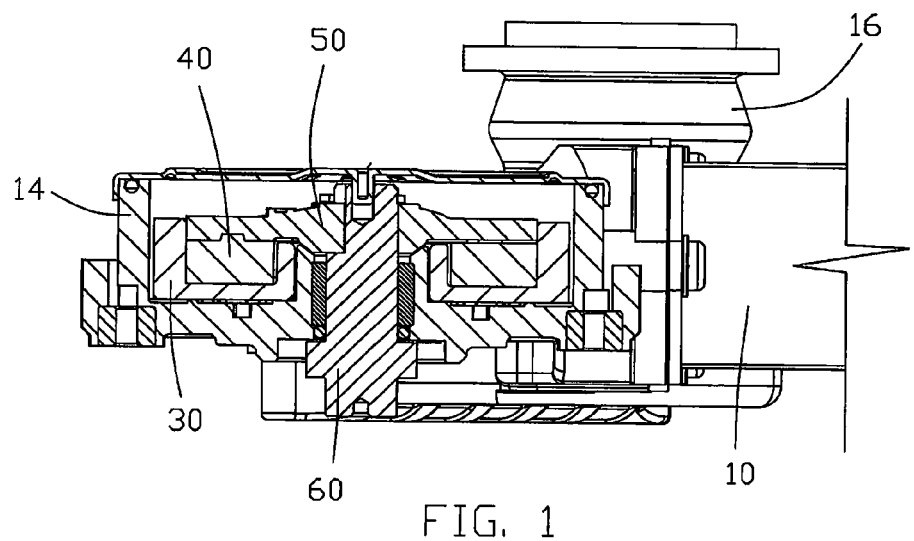
FIG. 1 is a partial cross sectional view of a motor assembly in accordance with an embodiment of the present invention.

FIG. 1 shows a partial cross sectional view of a motor assembly in accordance with the preferred embodiment of the present invention. The motor assembly comprises a motor 10 and a gear train driven by the motor 10. The gear train includes a force transmission structure. The gear train is contained in a gear housing 14 and a capstan 16, which is a part of a window lift mechanism, is visible at the back. The capstan is driven through gears (not shown) by the motor assembly.

Figure 2:
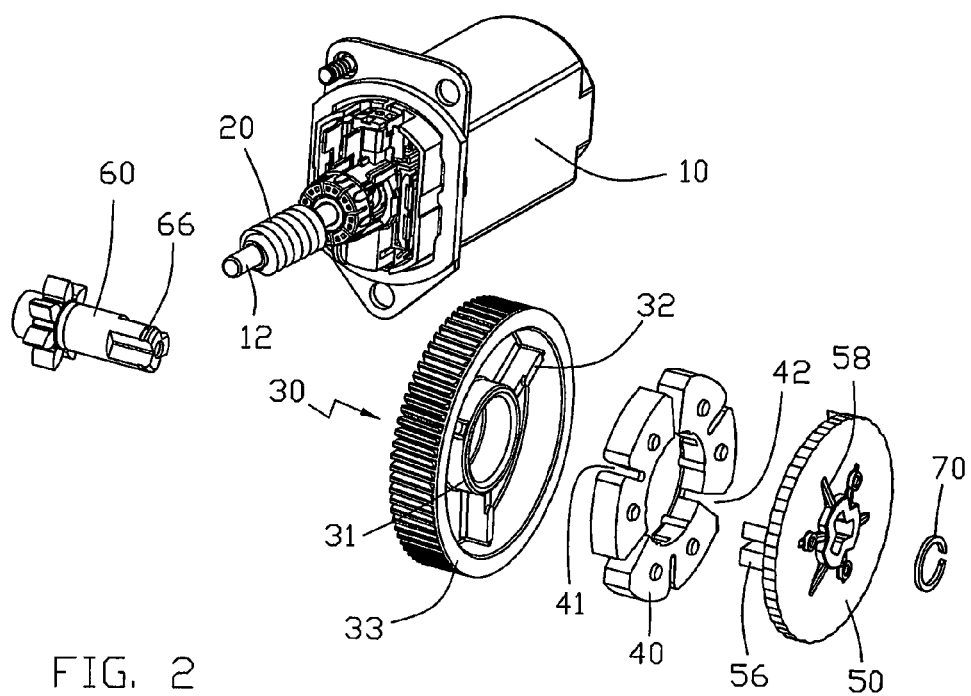
FIG. 2 is an exploded view of the motor assembly of FIG. 1.

FIG. 2 is an exploded view of the gear train, with the gear housing removed, to show the various components. The gear train comprises a worm 20 fitted to a motor shaft 12 driven by the motor 10, a worm gear 30 which meshes with the worm 20, a damper 40, a drive plate 50 and a shaft 60. The force transmission structure comprises the drive plate 50 and the shaft 60. The worm 20 may be press fitted to the motor shaft 12. Alternatively, the worm 20 may be formed integral with the motor shaft 12. The worm gear 30 comprises an inner ring 31, an outer ring 33, and a plurality of ribs 32 radially extending from the inner ring to the outer ring. Teeth are formed at the outer circumferential surface of the outer ring 33, for meshing with the worm 20. The damper 40 is made of rubber material, has a through opening at the center thereof and has a plurality of first slots 41 and second slots 42 extending radially thereof. The slots 41, 42 are arranged alternately in the circumferential direction.

Figure 3:
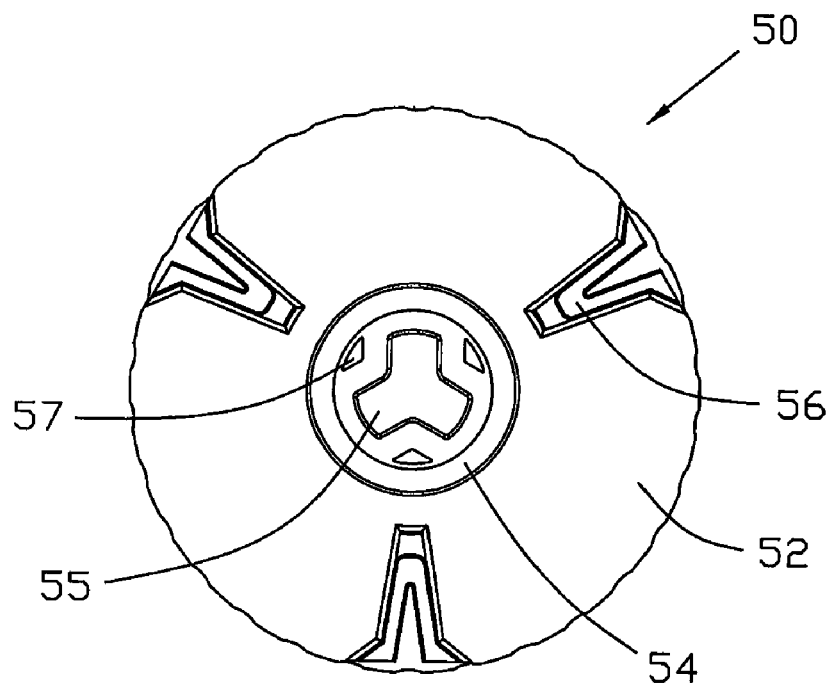
FIG. 3 is a plan view of a drive plate of the motor assembly of FIG. 1.

Referring also to FIG. 3, the drive plate 50, which may be made of an engineering plastics material, comprises a round body 52, a coupling 54 formed at the center of the body 52, a plurality of V-shaped protrusions 56 formed on one side of the body 52, and a plurality of ribs 58 formed on the opposite side of the body 52. The coupling 54 extends beyond the body 52 in opposite axial directions of the body 52 and therefore the coupling 54 has a greater depth or thickness than the body 52. The coupling 54 has a Y-shaped mounting hole 55 at the center thereof, that is, the mounting hole 55 comprises three sections interconnected at the center thereof. Preferably, the coupling 54 further has a plurality of buffer holes 57. In the embodiment, the buffer holes 57 are three blind holes which do not pass completely through the coupling 54 axially, and are evenly distributed in the circumferential direction, each one being located between adjacent sections of the Y-shaped hole 55. In this embodiment, the protrusions 56 comprise three protrusions 56 evenly distributed in the circumferential direction, the width of the protrusions increasing gradually from the inner most portion towards the outer most portion in the radial direction of the body 52. The central line of each protrusion 56 extends radially through the center of the body 52. The protrusions 56 are shaped and sized to fit the second slots 42 of the damper 40.

Figure 4:
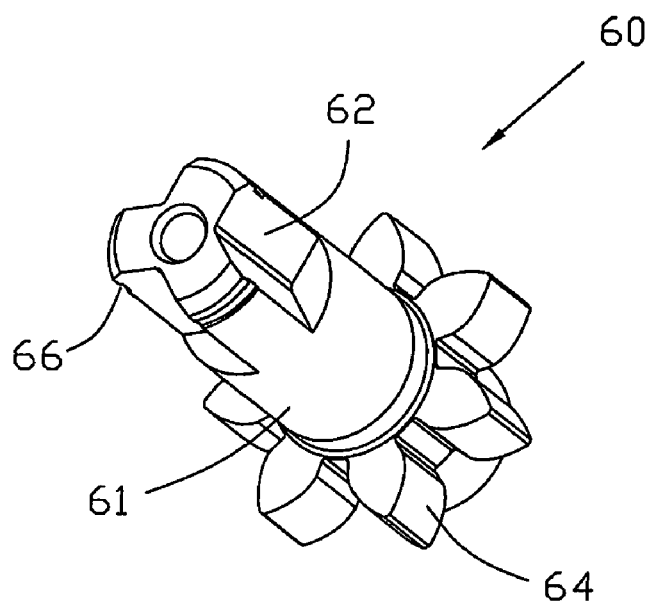
FIG. 4 is an isometric view of a shaft of the motor assembly of FIG. 1.

Referring to FIG. 4, the shaft 60, which is the output shaft of the gearbox in the preferred embodiment, comprises a round portion 61, a toothed portion 62 formed at one end of the round portion, and a pinion 64 formed at the other end of the round portion. The toothed portion 62 has a Y-shaped cross section and comprises three teeth evenly distributed in a circumferential direction of the shaft 60. The shape and size of the teeth of the toothed portion 62 conform to that of the mounting hole 55 of the drive plate 50. Preferably, the shaft 60 is made of low alloy steel. Alternatively, the shaft 60 may be made of other metal material. The pinion 64 is configured to couple with a gear, such as a gear train of a lift mechanism of a window lift system.

Figure 5:
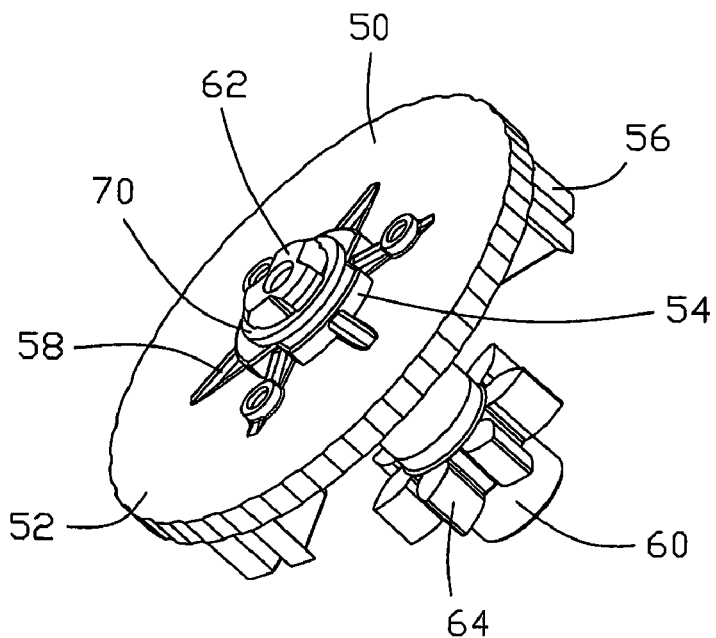
FIG. 5 is an assembled view of the drive plate of FIG. 3 and the shaft of FIG. 4.

Referring to FIGS. 1 and 5, when assembled, the damper 40 is located in a spaced formed between the inner ring 31 and outer ring 33 of the worm 30 and the ribs 32 of the worm 30 are received in the first slots 41 of the damper 40. The protrusions 56 of the drive plate 50 are respectively, interferentially and fittingly received in the second slots 42 of the damper 40. Thus, the drive plate 50 is rotated by the damper 40 and the worm gear 30 when the worm 20 drives the worm gear 30.

Figure 6A:
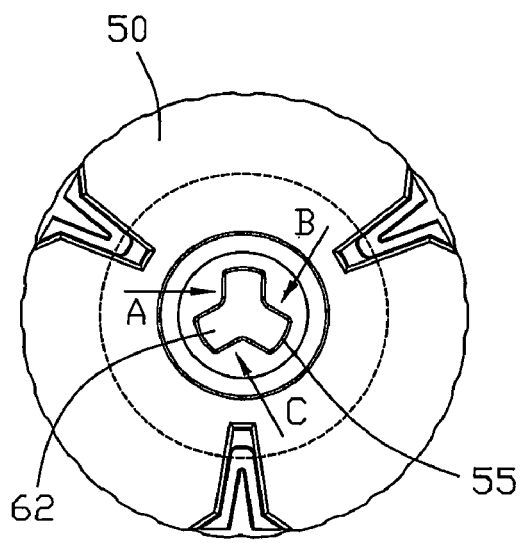
FIGS. 6A and 6B are schematic diagrams showing forces acting between the drive plate and the shaft.
Figure 6B:
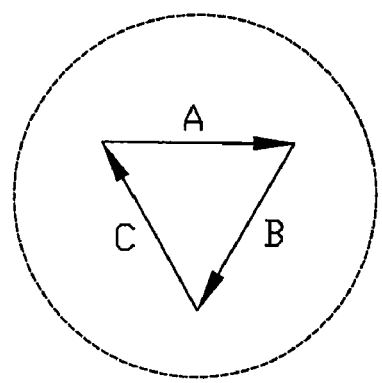

The Y-shaped toothed portion 62 of the shaft 60 extends through the inner ring 31 of the worm gear 30 to be fitted in the Y-shaped mounting hole 55 of the drive plate 50. The free end of the toothed portion 62 of the shaft 60 extends beyond the coupling 54. A circlip 70 is fitted in a slot 66 formed at the free end of the toothed portion 62 to prevent the toothed portion 62 escaping from the mounting hole 55. In operation, the motor 10 rotates the motor shaft 12, which rotates the worm 20, which drives the worm gear 30, which rotates the drive plate 50 via the damper 40, and thus rotates the shaft 60. The drive plate 50 drives the shaft 60 to rotate by the Y-shaped mounting hole 55 of the drive plate mating with the Y-shaped toothed portion 62 of the shaft 60. Consequently, the pinion 64 drives the capstan 16 via one or more gears (not shown) of the window lift system to thereby raise up or lower down the glass of the window. The window lift system may have a wire which is wound about the capstan to raise or lower the glass Referring to FIGS. 6A and 6B, in the embodiment of the present invention, when the shaft 60 is rotated by the drive plate 50, three equal forces A, B, C from the coupling 54 are exerted on the three teeth of the toothed portion 62 of the shaft 60 respectively. These three forces A, B, C exerting on the three teeth of the toothed portion 62 constitute a triangle as shown in FIG. 6B. Therefore, the shaft 60 is rotated stably to thereby move up and/or down the glass of the window lift system quietly. Furthermore, the contact area between the teeth of the shaft 60 and the coupling 54 of the drive plate 50 is greater than that in the traditional design, which results in the connection between coupler and the shaft being able to withstand a greater torque. Moreover, the drive plate 50 is ideally made of an engineering plastics material which has good strength and resistance to impact and can absorb vibration, which is helpful to reduce the noise generated by the gear train as well. The buffer holes 57 aid molding of the drive plate by providing relief when the plastics material is cooling in the mould to reduce distortion of the mounting hole 55.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A motor assembly comprising:
    a motor;
    a force transmission structure comprising a drive plate and a shaft; and
    a gear train connecting the motor to the drive plate for driving the drive plate;
    wherein the drive plate has a Y-shaped mounting hole with three sections interconnected with one another at a common area, the shaft has a Y-shaped toothed portion with three teeth fittingly received in the three sections of the mounting hole of the drive plate such that the shaft is fixed to rotate with the drive plate; the drive plate comprises a body and a coupling formed at the center of the body, the coupling having a greater axial depth than the body; the mounting hole being formed in the coupling; and the coupling has buffer holes respectively located between each of the three sections of the mounting hole in a circumferential direction of the driving plate.

2. The motor assembly of claim 1, wherein the gear train comprises a worm driven by the motor, a worm gear meshed with the worm, and a damper attached to and rotatable with the worm gear, the drive plate being driven by the worm gear through the damper.

3. The motor assembly of claim 2, wherein the worm comprises an inner ring, an outer ring, and a plurality of ribs extending from the inner ring to the outer ring, the damper being received in a space formed between the inner ring and the outer ring and having a plurality of first slots for fittingly receiving the ribs respectively.

4. The motor assembly of claim 2, wherein the drive plate further comprises a plurality of protrusions formed at one side of the body, and the damper has a plurality of second slots engaging with the protrusions of the drive plate.

5. The motor assembly of claim 4, wherein the protrusions are V-shaped, the width of the protrusions increasing from the inner most portion towards the outer most portion in a radial direction of the body.

6. The force transmission structure of claim 4, wherein the number of protrusions is equal to the number of sections of the mounting hole.

7. The motor assembly of claim 2, wherein the drive plate is made of a plastic material, and the damper is made of rubber.

8. The motor assembly of claim 1, wherein the shaft further comprises a pinion for driving a gear of a window lift system.

9. The motor assembly of claim 1, wherein the shaft is held captive within the mounting hole by a circlip located within a groove in the distal end of the toothed portion.

10. A force transmission structure comprising: a drive plate having a mounting hole and a shaft fitted to the mounting hole for rotation with the drive plate, wherein the mounting hole is Y-shaped and has three sections interconnected with one another at a common area, the shaft has a Y-shaped toothed portion with three teeth fittingly received in the three sections of the mounting hole such that the shaft is fixed to rotate with the drive plate; the drive plate comprises a body and a coupling formed at the center of the body, the coupling is axially deeper than the body, the mounting hole being formed in the coupling; and the coupling has buffer holes respectively located between each of the three sections of the mounting hole in a circumferential direction of the drive plate.

11. The force transmission structure of claim 10, wherein the drive plate has a plurality of protrusions formed on a first side of the body and configured to engage with a driving member such that the driving member is able to drive the drive plate, the shaft further comprises a pinion configured to drive a driven member.

12. The force transmission structure of claim 11, wherein the drive plate further comprises a plurality of ribs formed on a second side of the body which is opposite the first side of the body.

13. The force transmission structure of claim 11, wherein the number of protrusions is equal to the number of sections of the mounting hole.

14. The force transmission structure of claim 10, wherein the drive plate is made of a plastic material.

\* \* \* \* \*